US012406262B2

(12) United States Patent
Burmistrov et al.

(10) Patent No.: US 12,406,262 B2
(45) Date of Patent: *Sep. 2, 2025

(54) SYSTEMS AND METHODS FOR OPTIMIZING ELECTRONIC REFUND TRANSACTIONS FOR DETECTED FRAUDULENT TRANSACTIONS

(71) Applicant: Worldpay, LLC, Symmes Township, OH (US)

(72) Inventors: Dmitriy Burmistrov, Woburn, MA (US); Dennis A. Kettler, Mason, OH (US); Tao Hong, Acton, MA (US)

(73) Assignee: Worldpay, LLC, Symmes Township, OH (US)

( * ) Notice: Subject to any disclaimer, the term of this patent is extended or adjusted under 35 U.S.C. 154(b) by 114 days.

This patent is subject to a terminal disclaimer.

(21) Appl. No.: 18/348,538

(22) Filed: Jul. 7, 2023

(65) Prior Publication Data

US 2023/0351399 A1    Nov. 2, 2023

Related U.S. Application Data

(63) Continuation of application No. 16/822,254, filed on Mar. 18, 2020, now Pat. No. 11,790,367.

(51) Int. Cl.
*G06Q 20/40* (2012.01)
*H04L 9/40* (2022.01)

(52) U.S. Cl.
CPC ....... *G06Q 20/4016* (2013.01); *G06Q 20/407* (2013.01)

(58) Field of Classification Search
None
See application file for complete search history.

(56) References Cited

U.S. PATENT DOCUMENTS

| 10,825,012 | B1* | 11/2020 | Senci | G06Q 20/407 |
| 11,270,311 | B1* | 3/2022 | Jass | G06Q 20/4016 |
| 2007/0233615 | A1 | 10/2007 | Tumminaro | |
| 2014/0250011 | A1* | 9/2014 | Weber | G06Q 20/4016 705/44 |

(Continued)

*Primary Examiner* — Bennett M Sigmond
*Assistant Examiner* — Bhavin D Shah
(74) *Attorney, Agent, or Firm* — Bookoff McAndrews, PLLC

(57) ABSTRACT

A method for optimizing refunds for suspected or detected fraudulent transactions includes receiving a chargeback analysis request for a potential chargeback transaction from a merchant or a payment processor, extracting identifying information of transactions associated with the chargeback transaction from the chargeback analysis request, searching for a chargeback analysis profile in a profile database, determining whether the chargeback analysis profile exists in the profile database, upon determining that the chargeback analysis profile does not exist in the profile database, obtaining a new fraud analysis profile, determining, based on the chargeback analysis profile, a first probability that the potential chargeback transaction will result in a chargeback, determining, based on the chargeback analysis profile, a second probability that the potential chargeback transaction will result in a chargeback after a proactive electronic refund transaction, and generating a proactive electronic refund transaction based on the first probability and the second probability.

20 Claims, 5 Drawing Sheets

(56) References Cited

U.S. PATENT DOCUMENTS

| | | |
|---|---|---|
| 2016/0063500 A1 | 3/2016 | Sherlock et al. |
| 2016/0379216 A1* | 12/2016 | Wang ................... G06Q 20/407 705/44 |
| 2019/0073647 A1* | 3/2019 | Zoldi ................... G06Q 20/383 |
| 2020/0134628 A1* | 4/2020 | Jia ......................... G06N 20/00 |
| 2020/0210913 A1* | 7/2020 | Daggubati ............ G06F 16/258 |

* cited by examiner

SYSTEMS AND METHODS FOR OPTIMIZING ELECTRONIC REFUND TRANSACTIONS FOR DETECTED FRAUDULENT TRANSACTIONS

CROSS-REFERENCE TO RELATED APPLICATION(S)

This patent application is a continuation of and claims the benefit of priority to U.S. application Ser. No. 16/822,254, filed on Mar. 18, 2020, the entirety of which is incorporated herein by reference.

TECHNICAL FIELD

Various embodiments of the present disclosure relate generally to electronic payment fraud detection infrastructure and, more particularly, to optimizing refunds for suspected and/or detected fraudulent transactions.

BACKGROUND

Chargebacks may be required for certain online or brick-and-mortar payment transactions in situations of duplicate billing, a consumer returning a product, or fraudulent transactions. A chargeback results from a fraudulent transaction if a purchase is made using the consumer's payment card without the consumer's knowledge. In an alternative scenario, the consumer may not be honest in requesting a chargeback. For example, the consumer may dispute a chargeback for a product even after intentionally buying the product, which may result in a merchant losing revenue. An acquirer processor or merchant may proactively refund transactions reported as fraudulent transactions to the consumer. Such proactive electronic refund transactions in many cases may prevent possible chargebacks for the reported fraud. However, only approximately 50% of reported fraudulent transactions actually cause following chargebacks. In addition, approximately 10-20% of proactive refunds for reported fraudulent transactions do not prevent the following chargeback. Automatic refund for all reported fraudulent transactions may not be optimal, and may narrow the market for a fraud chargeback protection service (FCPS) providing proactive refunds. Thus, there is a need for a FCPS providing proactive refunds for which chargebacks will be required and fir which a following chargeback may be prevented by the proactive refund.

The present disclosure is directed to overcoming one or more of these above-referenced challenges.

SUMMARY OF THE DISCLOSURE

According to certain aspects of the present disclosure, systems and methods are disclosed for optimizing refunds for detected fraudulent transactions.

In one embodiment, a computer-implemented method is disclosed for optimizing refunds for suspected or detected fraudulent transactions, the method comprising: receiving a chargeback analysis request for a potential chargeback transaction from a merchant or a payment processor using an Application Programming Interface (API) over a computer network, extracting identifying information of transactions associated with the potential chargeback transaction from the chargeback analysis request, searching for a chargeback analysis profile linked to the extracted identifying information in a profile database, determining whether the chargeback analysis profile linked to the extracted identifying information exists in the profile database, upon determining that the chargeback analysis profile linked to the extracted identifying information does not exist in the profile database, obtaining a new fraud analysis profile, determining, based on the chargeback analysis profile, a first probability that the potential chargeback transaction will result in a chargeback, determining, based on the chargeback analysis profile, a second probability that the potential chargeback transaction will result in a chargeback after a proactive refund, and generating a proactive refund based on the first probability and the second probability.

In accordance with another embodiment, a system is disclosed for optimizing refunds for suspected or detected fraudulent transactions, the system comprising: a data storage device storing instructions for optimizing refunds for suspected or detected fraudulent transactions in an electronic storage medium; and a processor configured to execute the instructions to perform a method including: receiving a chargeback analysis request for a potential chargeback transaction from a merchant or a payment processor using an Application Programming Interface (API) over a computer network, extracting identifying information of transactions associated with the potential chargeback transaction from the chargeback analysis request, searching for a chargeback analysis profile linked to the extracted identifying information in a profile database, determining whether the chargeback analysis profile linked to the extracted identifying information exists in the profile database, upon determining that the chargeback analysis profile linked to the extracted identifying information does not exist in the profile database, obtaining a new fraud analysis profile, determining, based on the chargeback analysis profile, a first probability that the potential chargeback transaction will result in a chargeback, determining, based on the chargeback analysis profile, a second probability that the potential chargeback transaction will result in a chargeback after a proactive refund, and generating a proactive refund based on the first probability and the second probability.

In accordance with another embodiment, a non-transitory machine-readable medium storing instructions that, when executed by a computing system, causes the computing system to perform a method for optimizing refunds for suspected or detected fraudulent transactions, the method including: receiving a chargeback analysis request for a potential chargeback transaction from a merchant or a payment processor using an Application Programming Interface (API) over a computer network, extracting identifying information of transactions associated with the potential chargeback transaction from the chargeback analysis request, searching for a chargeback analysis profile linked to the extracted identifying information in a profile database, determining whether the chargeback analysis profile linked to the extracted identifying information exists in the profile database, upon determining that the chargeback analysis profile linked to the extracted identifying information does not exist in the profile database, obtaining a new fraud analysis profile, determining, based on the chargeback analysis profile, a first probability that the potential chargeback transaction will result in a chargeback, determining, based on the chargeback analysis profile, a second probability that the potential chargeback transaction will result in a chargeback after a proactive refund, and generating a proactive refund based on the first probability and the second probability.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Various embodiments of the present disclosure relate generally to optimizing refunds for detected fraudulent transactions.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section.

Figure 1:
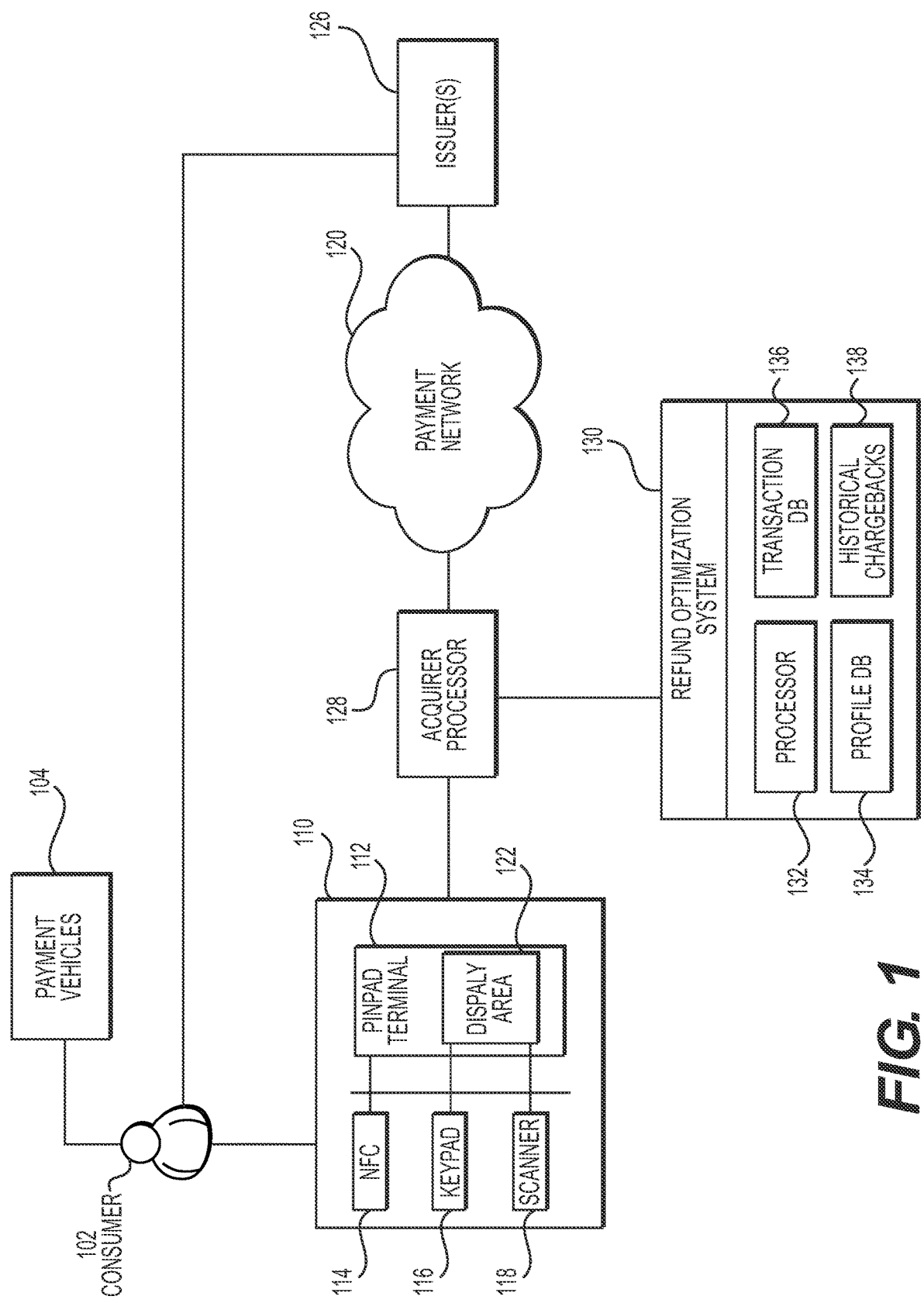
FIG. 1 depicts a block diagram of a fraud chargeback automatic refund system infrastructure, according to one or more embodiments.

Any suitable system infrastructure may be put into place to allow fraud chargeback automatic refunds. FIG. 1 and the following discussion provide a brief, general description of a suitable computing environment in which the present disclosure may be implemented. In one embodiment, any of the disclosed systems, methods, and/or graphical user interfaces may be executed by or implemented by a computing system consistent with or similar to that depicted in FIG. 1. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

As described above, there is a need for optimized proactive refunds of potential chargebacks. As discussed in further detail below, such optimization may include, for example, predicting which fraud cases are highly likely to cause a chargeback and restricting proactive refunds to only those predicted cases. In addition, optimization may include predicting those cases that may be likely to result in a chargeback even if a proactive refund were provided and rejecting proactive refunds in these cases. In making such predictions, merchants, acquirer processors, and/or issuers may define their own probability threshold for the fraud chargeback to potentially reduce ineffective refunds for the reported fraud.

FIG. 1 depicts a block diagram of a fraud chargeback automatic refund system infrastructure, according to one or more embodiments. Turning to FIG. 1, traditionally, in an electronic payment processing system, a consumer 102, during the checkout process with a merchant 110, may pay for goods or services from merchant 110 at a PIN Pad 112. Embodiments are described below in terms of a consumer present at a merchant location. However, embodiments are not so limited and should be considered to include online or e-commerce transactions. For example, consumer 102 may engage in an online or e-commerce transaction with merchant 110 and pay for goods or services by way of a computer, tablet, or smartphone, etc. (not shown). Consumer 102 may use a payment card as payment vehicle 104. The payment vehicle 104 used by the consumer is usually issued by financial institutions (e.g., banks) where the consumer keeps his/her funds in a savings or checking account, or by credit issuing companies that bill the consumer on a monthly basis. In one or more embodiments, the payment vehicles may be payment cards using computer chips to authenticate transactions according to Europay, MasterCard, and Visa (EMV) global standard or contactless payment vehicles using EMV or NFC technologies.

Because merchant 110 generally can use a different bank or financial institution 126 than consumer 102, an acquirer processor 128 handles the financial transactions that transfer payment between the financial institution 126 of consumer 102 and that of merchant 110. Consumer 102 submits payment information at the PIN Pad 112 associated with POS terminal of merchant 110, such as by swiping his or her payment card, inserting his or her chip-based payment card, through wireless near field communication (NFC), etc., or by any other suitable means. PIN Pad 112 sends a payment request to an acquirer processor 128. Alternatively, such a request may be sent by a component that controls a flow of a transaction, such as point of sale (POS). Acquirer processor 128 requests, by way of payment network 120, an electronic transfer of funds from the received funds to the financial institution 126 (e.g., issuer(s)) associated with merchant 110.

Merchant 110 may provide an infrastructure for processing electronic payment requests. FIG. 1 depicts a typical payment processing infrastructure (e.g., NFC 114, Keypad 116, Scanner 118, PIN Pad Terminal 112) for payment processing within a merchant environment, according to one or more embodiments. In an example embodiment, a consumer 102 may use one or more payment vehicles 104 for transactions at merchant 110.

In an example embodiment, as shown in FIG. 1, acquirer processor 128 may communicate with a refund optimization system 130, which may include a processor 132, profile database 134, historical transactional database 136, and historical chargeback(s) 138. The profile database 134 for a consumer 102 may comprise a unique identifier hash recognizing the profile associated with the individual's payment vehicles (e.g., debit, credit cards), personally identifiable information (PII), identifying information of transactions associated with the individual, and analysis of an individual's spending habits, geographic area, and fraud activities reported on the payment vehicles associated with the individual. In an example embodiment, the personally identifiable information (PII) about consumer 102 may include, for example, at least one of his/her name, email address, date of birth, social security number, and physical address, etc. The historical transaction database 136 may comprise transaction data associated with the payment vehicle 104. The transaction database 136 may comprise tables containing information associated with one or more transaction(s), such as, for example, a source ID, a terminal ID, a date and time of the transaction, an IP address, a location of the transaction, and a transaction amount. In an example embodiment, historical chargeback database 138 may comprise chargeback history associated with consumer 102 from one or more issuer(s) 126.

Figure 2:
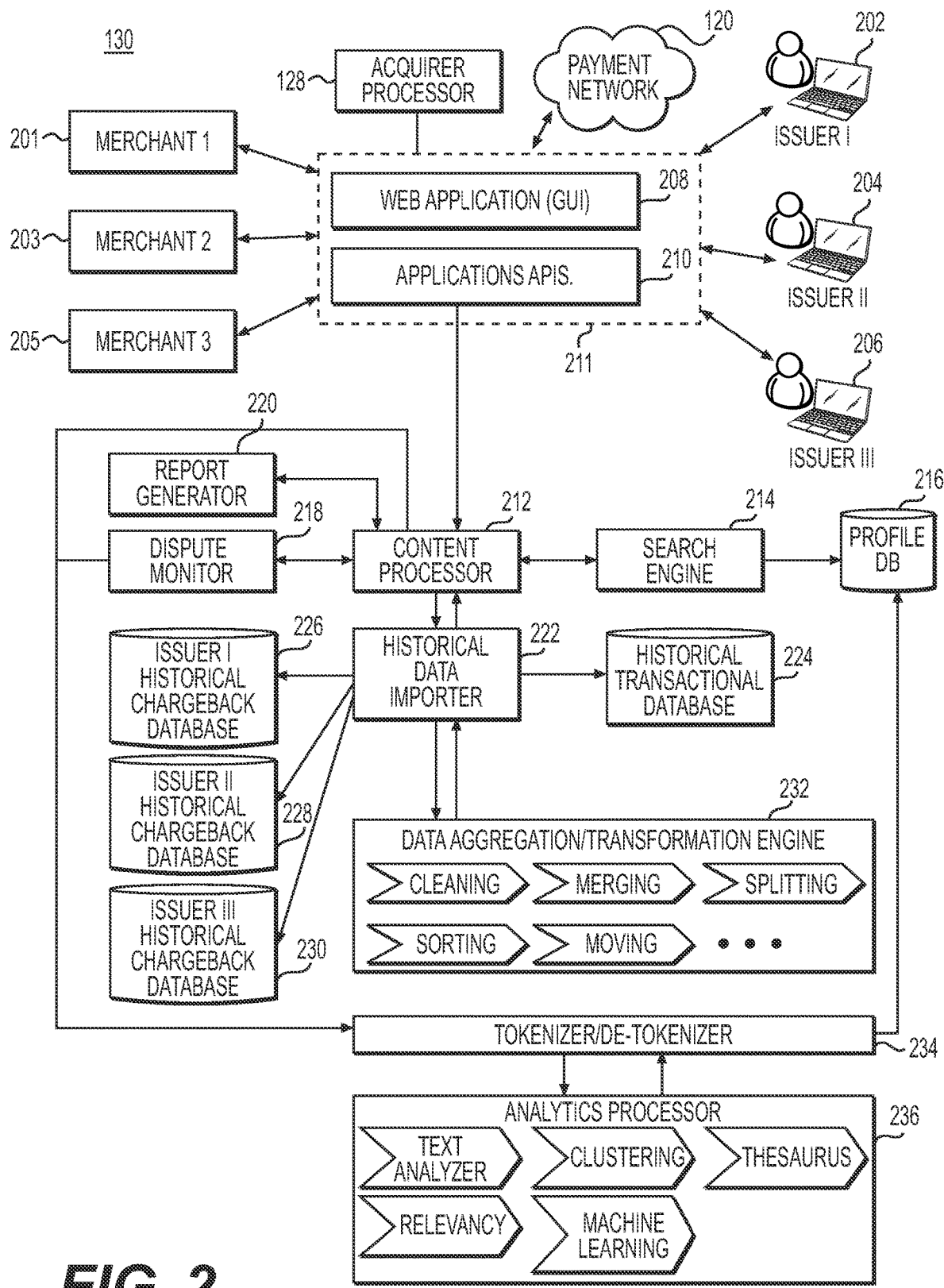
FIG. 2 depicts a schematic diagram of the fraud chargeback automatic refund system of FIG. 1, according to one or more embodiments.

FIG. 2 depicts a schematic diagram of the fraud chargeback automatic refund system of FIG. 1, according to one or more embodiments. Turning to FIG. 2, in an example embodiment, refund optimization system 130 may receive one or more chargeback(s) analysis requests from one or more merchant (e.g., 201, 203, and 205) and payment processor 128, and suspected and reported fraud and chargeback information from one or more issuers (e.g., Issuer I 202, Issuer II 204, and/or Issuer III 206) and payment network 120. The refund optimization system 130 may comprise, for example, content processor 212, search engine 214, report generator 220, historical data importer 222, and dispute monitor 218. The refund optimization system 130 may include profile database 216 and historical chargeback databases 226, 228, and 230 from issuers 202, 204, and 206, respectively. In the above-illustrated embodiment, the refund optimization system 130 may comprise data aggregation/transaction engine (232), tokenizer/de-tokenizer 234, and analytics processor 236.

In an example embodiment, the merchants (201, 203, 205) may submit a chargeback analysis request for a transaction and the issuers (202, 204, 206) may submit suspected or reported frauds and chargebacks using a computer interface 211, such as a web application 208 or application programming interface (API) 210, over a computer network. In an example embodiment, merchants and issuers may use an Application Programming Interface (API) and Hypertext Transfer Protocol (HTTP). The merchants and issuers may use HTTP CRUD (Create, Read, Update, Delete) operations to send the chargeback analysis request and reported frauds to the content processor 212.

In the above-illustrated embodiment, the content processor 212 may extract at least one of identifying information of transactions associated with consumer 102, personally identifiable information (PII) and a unique account identification submitted by the merchants (e.g. 201, 203, 205) and issuers (e.g., 202, 204, 206). The content processor 212 may query the search engine 214 to retrieve a chargeback analysis profile associated with the identifying information, Pll or the unique account identification. The search engine 214 may search for the chargeback analysis profile in a profile database 216.

In an example embodiment, search engine 214 may find the chargeback analysis profile for the queried chargeback(s) analysis request. The search engine 214 may further determine whether the chargeback analysis profile is generated within a specific time period (e.g., date and time), if such a time period is provided by the content processor 212. The search engine 214 may then deliver the chargeback analysis profile to the content processor 212. The content processor 212 may analyze the chargeback against the chargeback analysis profile. The chargeback analysis profile may include spending irregularities or suspicious activities associated with the unique account identification or the individual. The content processor 212 may analyze the chargeback(s) against spending irregularities or suspicious activities provided in the chargeback analysis profile. The content processor 212 may, for example, determine a multidimensional score for the chargeback(s) according to the analysis of chargeback(s) against the chargeback analysis profile. The multidimensional score may indicate, for example, a likelihood that a transaction, or multiple transactions meeting specified criteria, will result in a chargeback and/or a likelihood that such transactions will result in a chargeback even if a proactive refund is provided. The content processor 212 may present the analysis and multidimensional score to the requester merchant (e.g. 201, 203, 205) and issuer (e.g. 202, 204, 206) using a computer interface 211, such as web application 208 or application programming interface (API) 210, over a computer network. In an alternative embodiment, the content processor 212 may utilize report generator 220 to analyze the chargeback against the chargeback analysis profile and generate a report to be sent to the requesting merchant(s). The report could be sent to one or more merchant(s) using, for example, an API or email address of an agent requesting the chargeback analysis. Report generator 220 may be a cloud platform performing the analysis using HTTP protocol.

In an alternative embodiment, merchants (201, 203, 205) and issuers (202, 204, 206) may configure the content processor 212 to retrieve chargeback analysis profile for chargeback(s) within a specific range of values of goods and services. In a yet another embodiment, the content processor 212 may provide chargeback alert parameters for future transactions to merchants. The fraud alert parameters may be at least one of geographical restrictions, merchant restrictions, purchase price restrictions, etc. Chargeback alert parameters may automatically detect transactions meeting a specified threshold likelihood that the transaction will result in a chargeback or a threshold likelihood that the transaction will result in a chargeback even if a proactive refund is provided. In an example embodiment, report generator 220 may be a cloud platform (e.g., Web Service), where the report generator 220 may communicate with the content processor 212 using a Representational State Transfer (REST) Application Programming Interface (API). In an example embodiment, the dispute monitor 218 may be responsible for tracking the chargeback analysis request and generating an analysis report. The dispute monitor 218 may make calls to an API published by report generator 220 to track progress of analysis report generation and chargeback analysis profile generation.

In an alternative embodiment, if the chargeback analysis profile is not available for the requested chargeback analysis, search engine 214 may send a message to content processor 212. The content processor 212 may generate a unique hash and a chargeback analysis profile request. The content processor 212 may send the chargeback analysis profile request including the unique hash to historical data importer 222 to generate chargeback analysis profile for received identifying information of transactions associated with consumer 102, PII, or unique account identification. The historical data importer 222 may further import historical chargeback disputes from one or more merchant(s) and issuer(s) associated with at least one of the identifying information of transactions associated with the individual, PII, and unique account identification. The historical data importer 222 may further import historical transactions from historical transactional database 136. The historical transaction database 136 may comprise historical transactions from one or more merchant(s) and issuer(s). The historical transactions may be retrieved from payment networks (120), as shown in FIG. 1, when transaction authorization requests are sent for a payment transaction from an online or brick-and-mortar merchant (110) from point of sale terminal to a financial institutions (e.g., Issuer(s) 126). Transaction information for historical transactions may be retrieved before the authorization requests are routed to the financial institutions (e.g., Issuer(s) 126).

The historical data importer 222 may send the retrieved historical chargeback data and historical transaction data along with a chargeback analysis profile request to a data aggregation/transformation engine 232. The main tasks of data aggregation/transformation 232 may include data extraction, transformation, and loading into a temporary storage system. The data aggregation/transformation engine (e.g., processor) 232 may perform further operations such as data moving, cleaning, splitting, translation, merging, and sorting. The data aggregation/transformation engine 232 may store the transformed data in standard format such as, for example, in a relational database or a distributed file system.

In an alternative embodiment, a tokenizer 234 may tokenize the identifying information of transactions associated with the individual, PII, and the unique account identification associated with the aggregated data. The tokenized data may be further sent to analytics processor 236 for analyzing aggregated data and generating a chargeback analysis profile. The analytics processor 236 may use text analyzer, clustering, thesaurus, relevancy, and other custom rules to analyze the aggregated data and generate the chargeback analysis profile. A de-tokenizer 234 may de-tokenize the generated chargeback analysis profile and store the profile in the profile database 134. In an example embodiment, the dispute monitor 218 may notify the content processor 212 once the profile is generated and stored into the profile database 134. The content processor 212 may analyze one or more chargeback transaction(s) against the generated chargeback analysis profile, determine a multidimensional score, and send the analysis and multidimensional score to the requesting merchant(s). The multidimensional score may indicate, for example, a likelihood that a transaction, or multiple transactions meeting specified criteria, will result in a chargeback and/or a likelihood that such transactions will result in a chargeback even if a proactive refund is provided.

According to one or more embodiments, the components of infrastructure shown in FIGS. 1 and 2 may be connected by a computer network, such as, for example a local area network (LAN) or a wireless network, such as, for example, a WiFi network. However, other network connections among the components of infrastructure shown in FIGS. 1 and 2 may be used, such as, for example, a wide area network (WAN), the internet, or the cloud. Methods of establishing refund optimization system 130 for chargebacks according to one or more embodiments will be discussed with respect to FIGS. 3-4 below. Functions of the components of infrastructure 100 will be described below with respect to exemplary methods for refund optimization system 130.

FIGS. 1 and 2 and the discussion above provide a brief, general description of a suitable computing environment in which the present disclosure may be implemented. In one embodiment, any of the disclosed systems, methods, and/or graphical user interfaces may be executed by or implemented by a computing system consistent with or similar to that depicted in FIGS. 1 and 2. Although not required, aspects of the present disclosure are described in the context of computer-executable instructions, such as routines executed by a data processing device, e.g., a server computer, wireless device, and/or personal computer. Those skilled in the relevant art will appreciate that aspects of the present disclosure can be practiced with other communications, data processing, or computer system configurations, including: Internet appliances, hand-held devices (including personal digital assistants ("PDAs")), wearable computers, all manner of cellular or mobile phones (including Voice over IP ("VoIP") phones), dumb terminals, media players, gaming devices, virtual reality devices, multi-processor systems, microprocessor-based or programmable consumer electronics, set-top boxes, network PCs, mini-computers, mainframe computers, and the like. Indeed, the terms "computer," "server," and the like, are generally used interchangeably herein, and refer to any of the above devices and systems, as well as any data processor.

Aspects of the present disclosure may be embodied in a special purpose computer and/or data processor that is specifically programmed, configured, and/or constructed to perform one or more of the computer-executable instructions explained in detail herein. While aspects of the present disclosure, such as certain functions, are described as being performed exclusively on a single device, the present disclosure may also be practiced in distributed environments where functions or modules are shared among disparate processing devices, which are linked through a communications network, such as a Local Area Network ("LAN"), Wide Area Network ("WAN"), and/or the Internet. Similarly, techniques presented herein as involving multiple devices may be implemented in a single device. In a distributed computing environment, program modules may be located in both local and/or remote memory storage devices.

Aspects of the present disclosure may be stored and/or distributed on non-transitory computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the present disclosure may be distributed over the Internet and/or over other networks (including wireless networks), on a propagated signal on a propagation medium (e.g., an electromagnetic wave(s), a sound wave, etc.) over a period of time, and/or they may be provided on any analog or digital network (packet switched, circuit switched, or other scheme).

Figure 3:
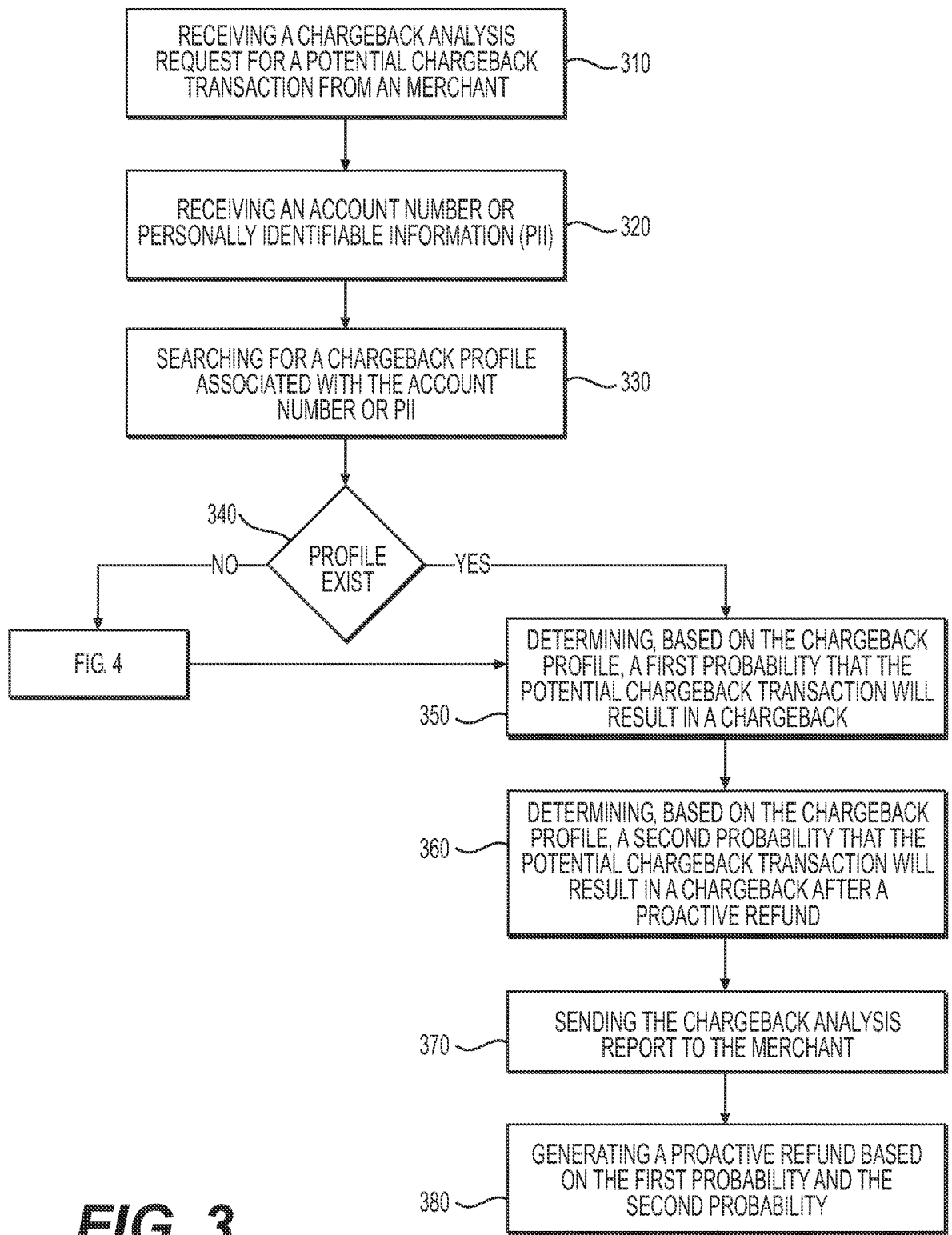
FIG. 3 depicts a flowchart of a method for fraud chargeback automatic refunds, according to one or more embodiments.

FIG. 3 depicts a flowchart of a method for fraud chargeback automatic refunds, according to one or more embodiments, such as may be performed by refund optimization system 130 depicted in FIG. 2. As shown in FIG. 3, in operation 310, the refund optimization system may receive a chargeback analysis request for a potential chargeback transaction from a merchant or an issuer. The chargeback analysis request may include a specified first threshold likelihood that the transaction will result in a chargeback and/or a second threshold likelihood that the transaction will result in a chargeback even if a proactive refund is provided. The first threshold likelihood and/or the second threshold likelihood may be determined by the merchant from which the chargeback analysis request was received, or may be determined by another entity involved in the transaction, such as, for example, an issuer or an acquirer processor. In operation 320, the refund optimization system may receive an account number or personally identifiable information (PII). In operation 330, the refund optimization system may search for a chargeback profile associated with the account number or PII. In operation 340, the refund optimization system may determine if a chargeback profile associated with the account number or PII does exist. If a chargeback profile associated with the account number or PII does not exist the refund optimization system may proceed with operations depicted in FIG. 4. In operation 350, the refund optimization system may determine, based on the chargeback profile, a first probability that the potential chargeback transaction will result in a chargeback. In operation 360, the refund optimization system may determine, based on the chargeback profile, a second probability that the potential chargeback transaction will result in a chargeback after a proactive refund. In operation 370, the refund optimization system may send the chargeback analysis report to the merchant. In operation 380, the refund optimization system may generate a proactive refund based on the first probability and the second probability. In one or more embodiments, the refund optimization system may compare the first probability with the first threshold likelihood and may generate the proactive refund if the first probability is greater than the first threshold likelihood. In one or more embodiments, the refund optimization system may compare the second probability with the second threshold likelihood and may generate the proactive refund is the second probability is not greater than the second threshold likelihood.

Figure 4:
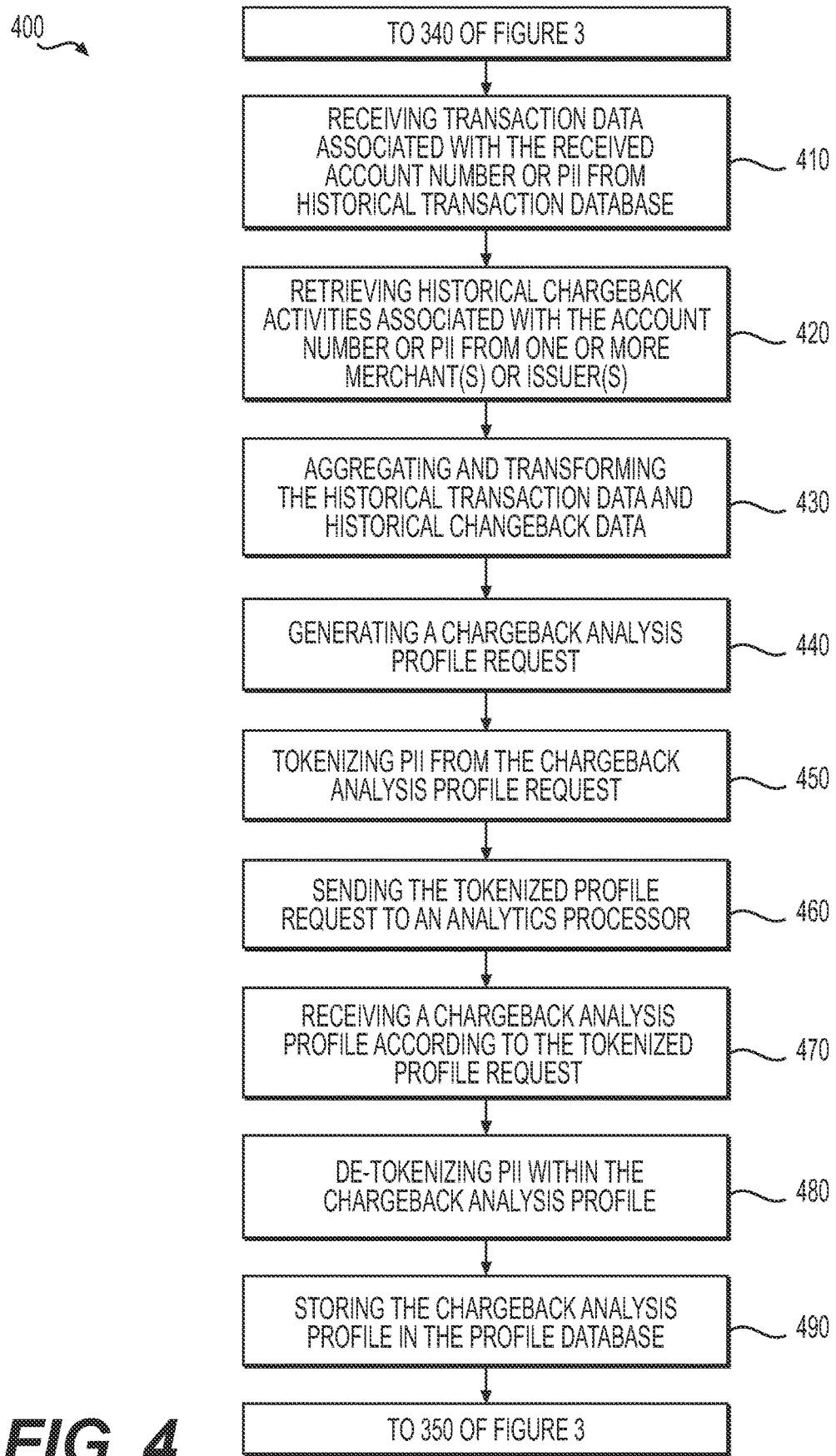
FIG. 4 depicts a flowchart of a method for generating a chargeback analysis profile, according to one or more embodiments.

FIG. 4 depicts a flowchart of a method for generating a chargeback analysis profile, according to one or more embodiments, such as may be performed by refund optimization system 130 depicted in FIG. 2. As shown in FIG. 4, the method may, for example, proceed from operation 340 of FIG. 3, upon a determination that a chargeback profile associated with the account number or PII does not exist. In one or more embodiments, processor 132, as a result of determining that a fraud analysis profile linked to at least one of the identifying information of transactions associated with the individual, account identification, and PII does not exist in the profile database and has not been generated within the defined time period, may receive historical transaction data associated with the at least one of retrieved identifying information of transactions associated with the individual, account identification, and PII from a historical transaction database 136, as per operation 410. Processor 132 may also retrieve reported fraudulent activities from one or more financial institution(s) 126 associated with the at least one of retrieved identifying information of transactions associated with the individual, account identification, and PII according to operation 420. In operation 430, processor 132 may further aggregate the retrieved historical transaction data and reported fraudulent activities in a temporary data storage.

In an example embodiment, moving to operation 440, the processor 132 may further generate a fraud analysis profile request, wherein the fraud analysis profile request includes at least one of aggregated historical transaction data and reported fraudulent activities, and a unique profile identifier. Processor 132 may tokenize at least one of the identifying information of transactions associated with the individual, PII, and the account identification within the fraud analysis profile request according to operation 450. Processor 132 may further send the fraud analysis profile request to a cloud platform for analysis using a Representational State Transfer (REST) API, as per operation 460. Processor 132 may further receive a fraud analysis profile from the cloud platform using the REST API and may detokenize the at least one of identifying information of transactions associated with the individual, PII, and the account identification within the received fraud analysis profile according to operation 470. Processor 132 may store the detokenized fraud analysis profile into profile database 134 according to operations 480 and 490. In an above-illustrated embodiment, the fraud analysis profile may include at least one of spending irregularities and suspicious activities associated with the identifying information of transactions associated with the individual, account identification, and PII. The spending irregularities may be calculated based on, for example, at least one of the individual's spending patterns, geographic region of IP address, billing address, and a type of payment card. The historical transaction data may be associated with the at least one of retrieved identifying information of transactions associated with the individual, account identification, and PII from the historical transaction database 136, and may comprise at least one of a merchant's identification, a location and terminal information, a source IP address, a date and time, device information, and a transaction amount for each of one or more purchase transactions. The type of fraud analysis profile request may comprise of a fraud analysis request for transactions within a specified value of the goods and services.

The method may then, for example, return to operation 350 of FIG. 3.

Figure 5:
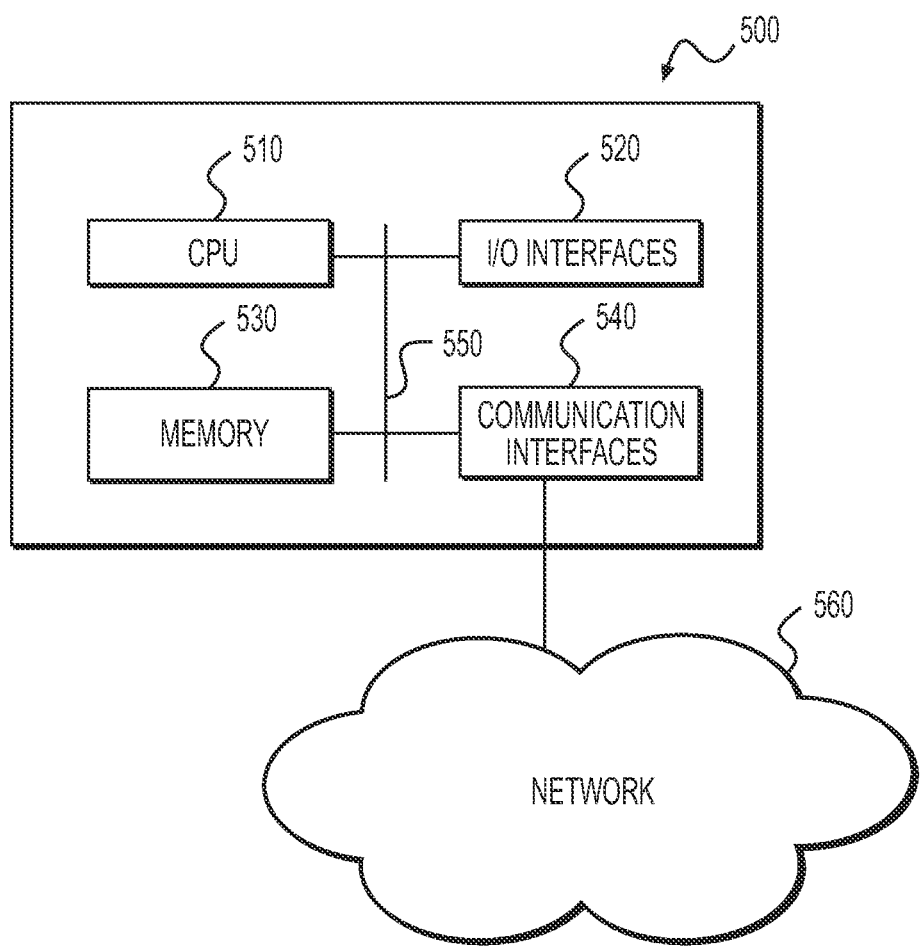
FIG. 5 depicts an example of a computing device.

The systems and processes described above performed by processor 132 (or content processor 212) may be performed on or between one or more computing devices. FIG. 5 depicts an example of a computing device. A computing device 500 may be a server, a computing device that is integrated with other systems or subsystems, a mobile computing device such as a smart phone, a cloud-based computing ability, and so forth. The computing device 500 may be any suitable computing device as would be understood in the art, including without limitation, a custom chip, and embedded processing device, a tablet computing device, a POS terminal associated with the merchant 110, a back-office system of a merchant 110, a personal data assistant (PDA), a desktop, laptop, microcomputer, and minicomputer, a server, a mainframe, or any other suitable programmable device. In various embodiments disclosed herein, a single component may be replaced by multiple components and multiple components may be replaced by single component to perform a given function or functions. Except where such substitution would not be operative, such substitution is within the intended scope of the embodiments.

The computing device 500 includes a processor 510 that may be any suitable type of processing unit, for example a general-purpose central processing unit (CPU), a reduced instruction set computer (RISC), a processor that has a pipeline or multiple processing capability including having multiple cores, a complex instruction set computer (CISC), a digital signal processor (DSP), application specific integrated circuits (ASIC), a programmable logic devices (PLD), and a field programmable gate array (FPGA), among others. The computing resources may also include distributed computing devices, cloud computing resources, and virtual computing resources in general.

The computing device 500 also includes one or more memories 530, for example read-only memory (ROM), random access memory (RAM), cache memory associated with the processor 510, or other memory such as dynamic RAM (DRAM), static RAM (SRAM), programmable ROM (PROM), electrically erasable PROM (EEPROM), flash memory, a removable memory card or disc, a solid-state drive, and so forth. The computing device 500 also includes storage media such as a storage device that may be configured to have multiple modules, such as magnetic disk drives, floppy drives, tape drives, hard drives, optical drives and media, magneto-optical drives and media, compact disk drives, Compact Disc Read Only Memory (CD-ROM), compact disc recordable (CD-R), Compact Disk Rewritable (CD-RW), a suitable type of Digital Versatile Disc (DVD) or Blu-ray disc, and so forth. Storage media such as flash drives, solid-state hard drives, redundant array of individual discs (RAID), virtual drives, networked drives and other memory means including storage media on the processor 510, or memories 530 are also contemplated as storage devices. It may be appreciated that such memory may be internal or external with respect to operation of the disclosed embodiments. It may be appreciated that certain portions of the processes described herein may be performed using instructions stored on a computer readable medium or media that direct computer system to perform the process steps. Non-transitory computable-readable media, as used herein, comprises all computer-readable media except for transitory, propagating signals.

Networking communication interfaces 540 may be configured to transmit to, or receive data from, other computing devices 500 across a network 560. The network and communication interfaces 540 may be an Ethernet interface, a radio interface, a Universal Serial Bus (USB) interface, or any other suitable communications interface and may include receivers, transmitter, and transceivers. For purposes of clarity, a transceiver may be referred to as a receiver or a transmitter when referring to only the input or only the output functionality of the transceiver. Example communication interfaces 540 may include wire data transmission links such as Ethernet and TCP/IP. The communication interfaces 540 may include wireless protocols for interfacing with private or public networks 560. For example, the network and communication interfaces 540 and protocols may include interfaces for communicating with private wireless networks such as Wi-Fi network, one of the IEEE 802.11x family of networks, or another suitable wireless network. The network and communication interfaces 540 may include interfaces and protocols for communicating with public wireless networks 560, using for example wireless protocols used by cellular network providers, including Code Division Multiple Access (CDMA) and Global System for Mobile Communications (GSM). A computing device 500 may use network and communication interfaces 540 to communicate with hardware modules such as a database or data store, or one or more servers or other networked computing resources. Data may be encrypted or protected from unauthorized access.

In various configurations, the computing device 500 may include a system bus 550 for interconnecting the various components of the computing device 500, or the computing device 500 may be integrated into one or more chips such as programmable logic device or application specific integrated circuit (ASIC). The system bus 550 may include a memory controller, a local bus, or a peripheral bus for supporting input and output devices 520, and communication interfaces 540. Example input and output devices 520 include keyboards, keypads, gesture or graphical input devices, motion input devices, touchscreen interfaces, one or more displays, audio units, voice recognition units, vibratory devices, computer mice, and any other suitable user interface.

The processor 510 and memory 530 may include non-volatile memory for storing computable-readable instructions, data, data structures, program modules, code, microcode, and other software components for storing the computer-readable instructions in non-transitory computable-readable mediums in connection with the other hardware components for carrying out the methodologies described herein. Software components may include source code, compiled code, interpreted code, executable code, static code, dynamic code, encrypted code, or any other suitable type of code or computer instructions implemented using any suitable high-level, low-level, object-oriented, visual, compiled, or interpreted programming language.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method for optimizing electronic refund transactions for suspect or detected fraudulent transactions, the method comprising:

receiving, by a computer processor, a chargeback analysis request for a potential chargeback transaction from a merchant or a payment processor;

extracting, by the computer processor, identifying information of transactions associated with the potential chargeback transaction from the chargeback analysis request;

retrieving, by the computer processor, historical transaction data associated with the identifying information of transactions from at least one of a plurality of issuer chargeback databases;

generating, by the computer processor, a chargeback analysis profile request, wherein the chargeback analysis profile request includes a unique profile identifier and aggregated historical transaction data from the plurality of issuer chargeback databases;

tokenizing, by the computer processor, the identifying information and the unique profile identifier of transactions associated with the potential chargeback transaction within the chargeback analysis profile request;

sending, by the computer processor, the chargeback analysis profile request to a cloud platform for analysis;

receiving, by the computer processor, a chargeback analysis profile from the cloud platform;

detokenizing, by the computer processor, the identifying information and the unique profile identifier of transactions associated with the potential chargeback transaction within the chargeback analysis profile;

determining, by the computer processor based on the chargeback analysis profile, a first probability that the potential chargeback transaction will result in a chargeback;

determining, by the computer processor based on the chargeback analysis profile, a second probability that the potential chargeback transaction will result in a chargeback following a refund of the potential chargeback transaction; and generating, by the computer processor, an electronic refund transaction based on the first probability and the second probability.

2. The method of claim 1, wherein generating the electronic refund transaction based on the first probability and the second probability comprises:

comparing, by the computer processor, the first probability with a first threshold likelihood and, based on determining that the first probability is greater than the first threshold likelihood, generating the electronic refund transaction; or comparing, by the computer processor, the second probability with a second threshold likelihood and, based on determining that the second probability is not greater than the second threshold likelihood, generating the electronic refund transaction.

3. The method of claim 2, wherein the first threshold likelihood and the second threshold likelihood are specified in the chargeback analysis request.

4. The method of claim 1, further comprising:

searching, by the computer processor, for a chargeback analysis profile linked to the extracted identifying information in a profile database; and determining, by the computer processor, whether the chargeback analysis profile linked to the extracted identifying information exists in the profile database.

5. The method of claim 1, wherein the chargeback analysis request comprises at least one of identifying information of transactions associated with one or more chargebacks, an account identification, personally identifiable information (PII), transaction detail, and a type of the chargeback analysis request for the potential chargeback transaction, and wherein the PII comprises at least one of a name, an address, a social security number, and an email address.

6. The method of claim 1, wherein the chargeback analysis profile includes at least one of spending irregularities and suspicious activities associated with the identifying information of the potential chargeback transaction, account identification, or personally identifiable information (PII).

7. The method of claim 6, wherein the spending irregularities are calculated based on at least one of a related cardholder's spending patterns, a geographic region of an IP address, a billing address, and a type of payment card.

8. A system for optimizing refunds for suspected or detected fraudulent transactions, the system comprising:

a data storage device storing instructions for fraud chargeback automatic refunds in an electronic storage medium; and a processor configured to execute the instructions to perform operations comprising:

receiving a chargeback analysis request for a potential chargeback transaction from a merchant or a payment processor;

extracting identifying information of transactions associated with the potential chargeback transaction from the chargeback analysis request;

retrieving historical transaction data associated with the identifying information of transactions from at least one of a plurality of issuer chargeback databases;

generating a chargeback analysis profile request, wherein the chargeback analysis profile request includes a unique profile identifier and aggregated historical transaction data from the plurality of issuer chargeback databases;

tokenizing the identifying information of transactions associated with the potential chargeback transaction and the unique profile identifier within the chargeback analysis profile request;

sending the chargeback analysis profile request to a cloud platform for analysis;

receiving a chargeback analysis profile from the cloud platform;

detokenizing the identifying information of transactions associated with the potential chargeback transaction and the unique profile identifier within the chargeback analysis profile;

determining, based on the chargeback analysis profile, a first probability that the potential chargeback transaction will result in a chargeback;

determining, based on the chargeback analysis profile, a second probability that the potential chargeback transaction will result in a chargeback following a refund of the potential chargeback transaction; and generating an electronic refund transaction based on the first probability and the second probability.

9. The system of claim 8, wherein generating the electronic refund transaction based on the first probability and the second probability comprises:

comparing the first probability with a first threshold likelihood and, based on determining that the first probability is greater than the first threshold likelihood, generating the electronic refund transaction; or comparing the second probability with a second threshold likelihood and, based on determining that the second probability is not greater than the second threshold likelihood, generating the electronic refund transaction.

10. The system of claim 9, wherein the first threshold likelihood and the second threshold likelihood are specified in the chargeback analysis request.

11. The system of claim 8, wherein the operations further comprise:

searching for a chargeback analysis profile linked to the extracted identifying information in a profile database;

determining whether the chargeback analysis profile linked to the extracted identifying information exists in the profile database; and based on determining that the chargeback analysis profile linked to the extracted identifying information does not exist in the profile database, retrieving historical transaction data associated with the extracted identifying information from a historical transaction database.

12. The system of claim 8, wherein the chargeback analysis request comprises at least one of identifying information of transactions associated with one or more chargebacks, an account identification, personally identifiable information (PII), transaction detail, and a type of the chargeback analysis request for the potential chargeback transaction, and wherein the PII comprises at least one of a name, an address, a social security number, and an email address.

13. The system of claim 8, wherein the chargeback analysis profile includes at least one of spending irregularities and suspicious activities associated with the identifying information of the potential chargeback transaction, account identification, or personally identifiable information (PII).

14. The system of claim 13, wherein the spending irregularities are calculated based on at least one of a related cardholder's spending patterns, a geographic region of an IP address, a billing address, and a type of payment card.

15. A non-transitory machine-readable medium storing instructions that, when executed by a computing system, causes the computing system to perform a operations for optimizing refunds for suspected or detected fraudulent transactions, the operations including:
   receiving a chargeback analysis request for a potential chargeback transaction from a merchant or a payment processor;
   extracting identifying information of transactions associated with the potential chargeback transaction from the chargeback analysis request;
   retrieving historical transaction data associated with the identifying information of transactions from at least one of a plurality of issuer chargeback databases;
   generating a chargeback analysis profile request, wherein the chargeback analysis profile request includes a unique profile identifier and aggregated historical transaction data from the plurality of issuer chargeback databases;
   tokenizing the identifying information of transactions associated with the potential chargeback transaction and the unique profile identifier within the chargeback analysis profile request;
   sending the chargeback analysis profile request to a cloud platform for analysis;
   receiving a chargeback analysis profile from the cloud platform;
   detokenizing the identifying information of transactions associated with the potential chargeback transaction and the unique profile identifier within the chargeback analysis profile;
   determining, based on the chargeback analysis profile, a first probability that the potential chargeback transaction will result in a chargeback;
   determining, based on the chargeback analysis profile, a second probability that the potential chargeback transaction will result in a chargeback following a refund of the potential chargeback transaction; and
   generating an electronic refund transaction based on the first probability and the second probability.

16. The non-transitory machine-readable medium of claim 15, wherein generating the electronic refund transaction based on the first probability and the second probability comprises:
   comparing the first probability with a first threshold likelihood and, based on determining that the first probability is greater than the first threshold likelihood, generating the electronic refund transaction; or
   comparing the second probability with a second threshold likelihood and, based on determining that the second probability is not greater than the second threshold likelihood, generating the electronic refund transaction.

17. The non-transitory machine-readable medium of claim 16, wherein the first threshold likelihood and the second threshold likelihood are specified in the chargeback analysis request.

18. The non-transitory machine-readable medium of claim 15, wherein the operations further comprise:
   searching for a chargeback analysis profile linked to the extracted identifying information in a profile database;
   determining whether the chargeback analysis profile linked to the extracted identifying information exists in the profile database; and
   based on determining that the chargeback analysis profile linked to the extracted identifying information does not exist in the profile database, retrieving historical transaction data associated with the extracted identifying information from a historical transaction database.

19. The non-transitory machine-readable medium of claim 15, wherein the chargeback analysis request comprises at least one of identifying information of transactions associated with one or more chargebacks, an account identification, personally identifiable information (PII), transaction detail, and a type of the chargeback analysis request for the potential chargeback transaction, and wherein the PII comprises at least one of a name, an address, a social security number, and an email address.

20. The non-transitory machine-readable medium of claim 15, wherein the chargeback analysis profile includes at least one of spending irregularities and suspicious activities associated with the identifying information of the potential chargeback transaction, account identification, or personally identifiable information (PII).

* * * * *